Patented Aug. 12, 1952

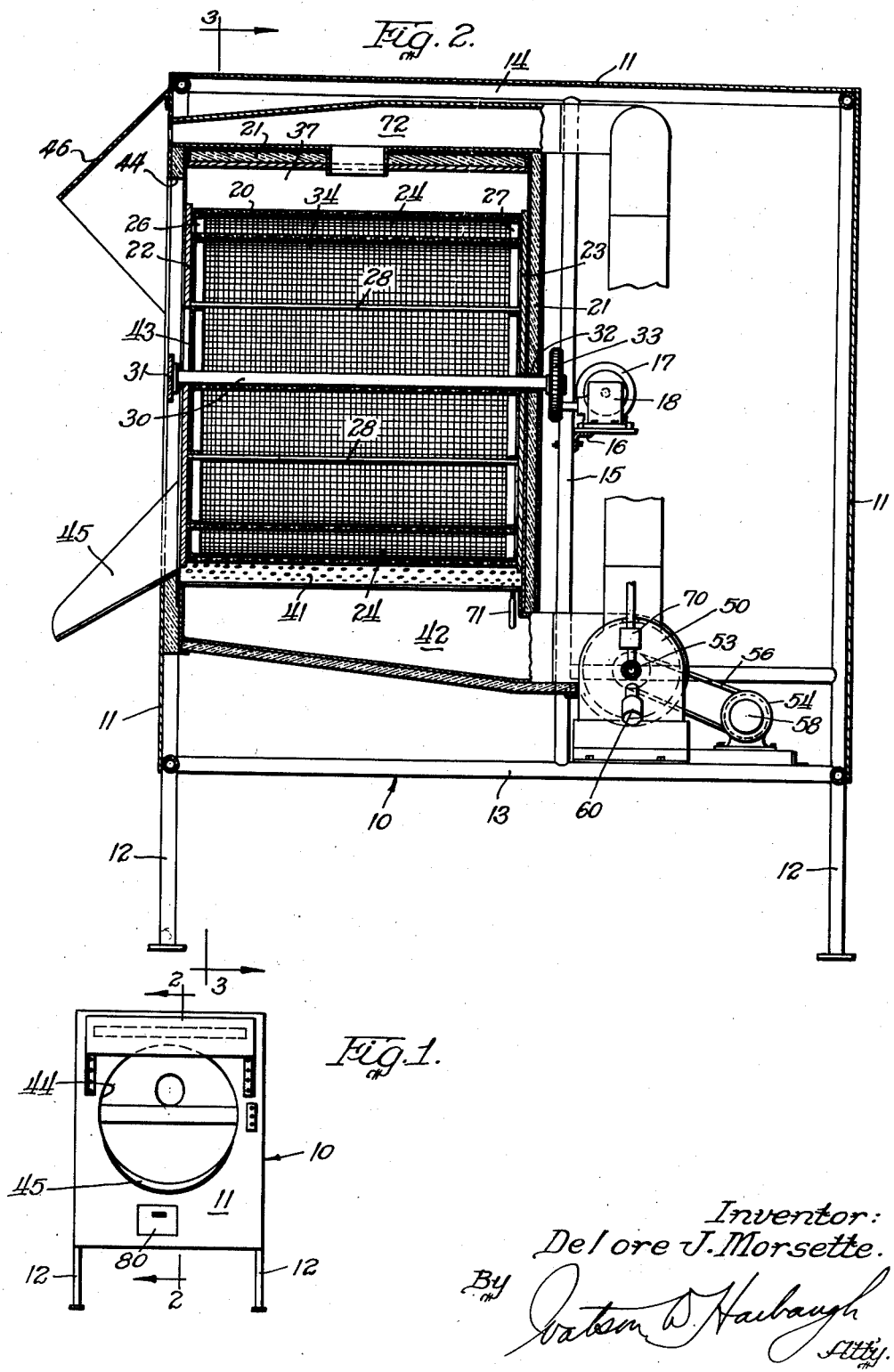
Aug. 12, 1952 — D. J. MORSETTE — 2,606,489
CORN POPPING APPARATUS
Filed May 2, 1947 — 3 Sheets-Sheet 1
Inventor:
Delore J. Morsette.

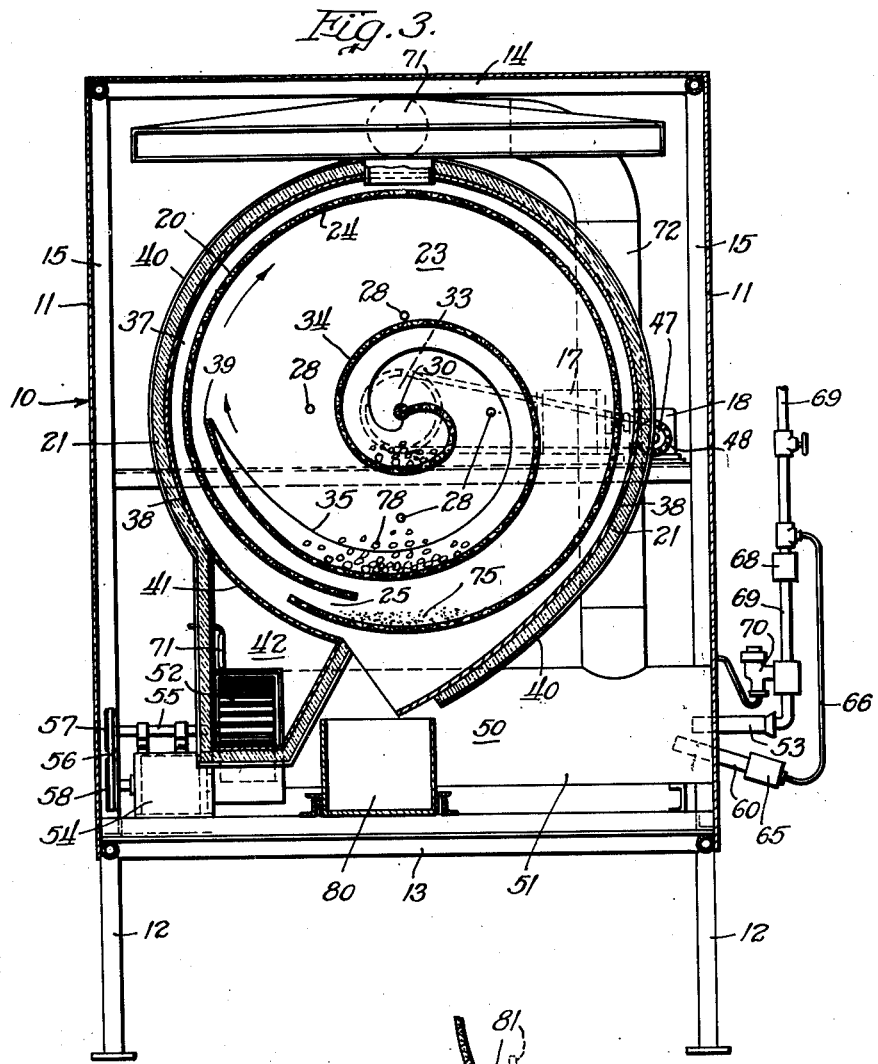

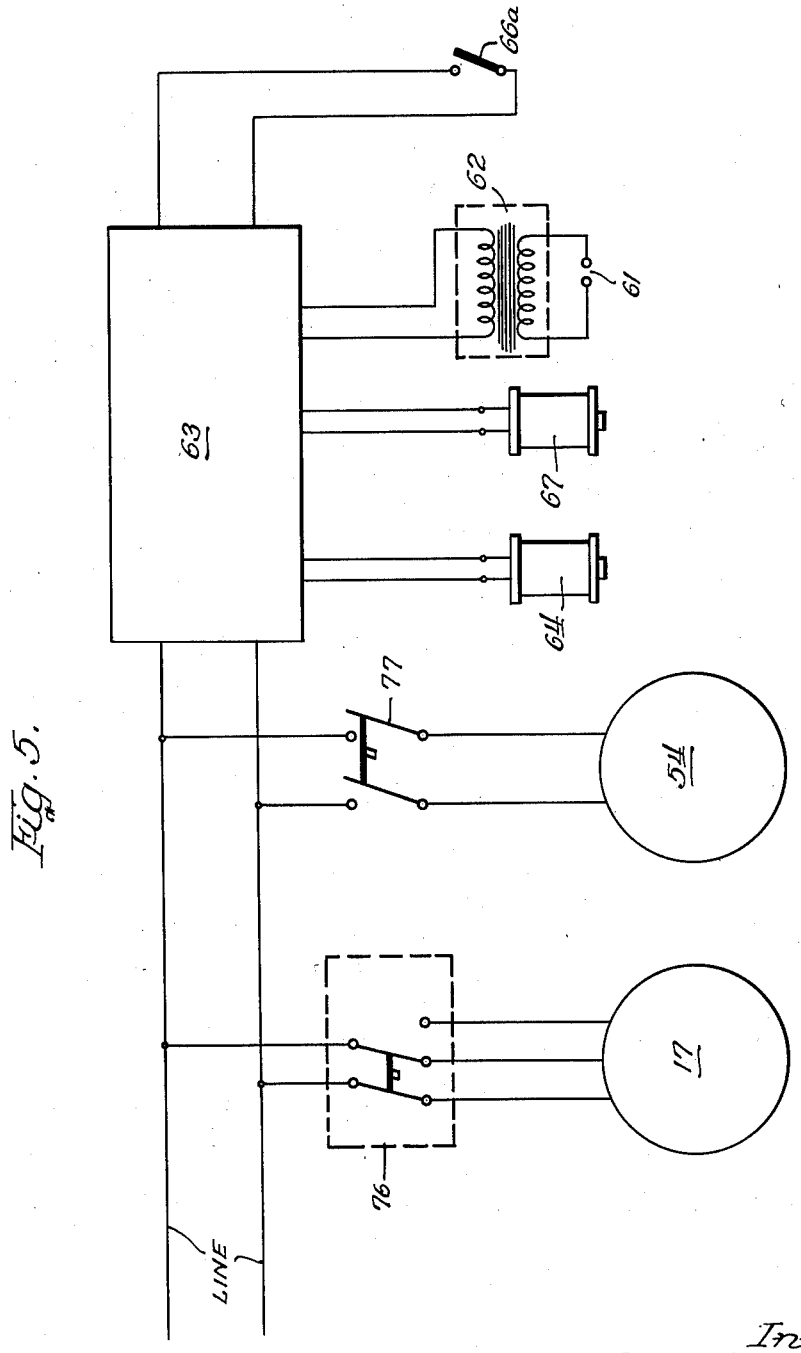

2,606,489

UNITED STATES PATENT OFFICE 2,606,489

CORN POPPING APPARATUS

Delore J. Morsette, Palatine, Ill.

Application May 2, 1947, Serial No. 745,563

7 Claims. (Cl. 99—238.6)

This invention relates generally to corn poppers and more particularly to an improved type of power operated corn popping machine.

The machine of this invention is intended primarily for commercial use in establishments which pop large volumes of corn daily, but smaller machines may be readily adapted for use in stores or restaurants which pop corn for sale on the premises.

Conventional corn poppers in commercial use are beset with many disadvantages. Chief among them are (1) the constant presence of a fire hazard as long as the machine is operating, (2) a high percentage of scrap loss due to kernels of corn not being popped, (3) considerable smoke and dust produced during the popping process which must be conducted through flues and chimneys in order not to contaminate the atmosphere in the room, and (4) excessive amounts of gas or other fuel required resulting in increased cost and excessive heating of room in which the popper is installed.

When corn is popped, a substantial number of kernels in each batch do not pop completely, the resulting kernel being puffed out on one side only or only slightly expanded in volume. These partially popped kernels present a problem in that they are too large to be retained in the popper with the scrap and are, therefore, carried outwardly with the fully popped kernels. This has necessitated that the popped corn be thoroughly screened after popping to eliminate the partially popped kernels which otherwise would contaminate the batch.

It is well known that popped corn, immediately after popping, is much less brittle than it is after it has emerged from the popper in its more completely dehydrated form. Consequently, screening corn after it emerges from the popper results in considerable breakage of the individual kernels which reduces the quality of the product and increases the amount of scrap. Therefore, the apparatus of this invention contemplates the carrying out of a classification operation within the popper which is equivalent to subsequent screening in that only completely popped kernels are allowed to pass out of the machine.

One object of this invention is to provide an improved popper in which a blast of hot air is used to pop the corn without flame contact on the kernels and this blast not only serves to pop the corn but also to separate unpopped and partially popped kernels from those which have been completely popped.

Another object of this invention is to provide a corn popping apparatus which will handle a relatively large charge of corn each time a batch is popped, thereby increasing the volume of the machine over a conventional machine of the same size.

Another object is to provide a machine in which air is heated by a gas flame and passed through the popper drum to pop the corn, a major portion of the air being recycled through the heater to increase the thermal efficiency including the consumption of chaff and fumes developed in the drum.

Another object is to provide a machine having a rotating drum provided with a plurality of screens for retaining corn in the drum and for conveying popped corn out of the drum, the retainer screen being so arranged that when the direction of rotation of the drum is reversed the scrap will be dumped completely therefrom.

A further object is to provide a machine which will be substantially fireproof as well as efficient in reducing the amount of scrap to a minimum.

A further object is to provide a machine which is as nearly fully automatic as feasible, reducing the amount of discretion necessary on the part of the operator.

A further object is to provide an improved machine having a burner unit with a motor driven blower incorporated therein in order to provide a high velocity stream of heated air over the popcorn containing drum with little heat loss to the atmosphere.

A further object is to provide a popper which will produce a superior grade of scrap characterized by a low percentage of charred kernels, the scrap consisting substantially of dark brown cooked kernels of corn suitable after grinding for a cattle feed.

Other and additional objects and advantages of this invention will be apparent to those familiar with the art on reading the following specification in conjunction with the drawings and the appended claims.

In the drawings:

Fig. 1 is a front view of the machine of this invention.

Fig. 2 is a vertical section taken on line 2—2 of Fig. 1.

Fig. 3 is a vertical section taken on line 3—3 of Fig. 2.

Fig. 4 is a section of a portion of the drum and the scrap drawer arrangement.

Fig. 5 is a wiring diagram.

Fig. 6 is a view of a portion of the drum of a modified embodiment.

The popping machine 10, as shown in Fig. 1, is contained in a rectangular metal case 11 supported on four legs 12 preferably formed of pipes welded together. The case 11 is provided largely to enclose the various mechanism and to protect it from dust or dirt as well as to prevent the operator from coming into contact with moving machinery or hot surfaces.

Horizontal pipes 13 are welded to each of the legs at a point about eighteen inches off the floor and form a support for the various elements within the machine 10, as shown in Figs. 2 and 3. Four similar horizontal pipes 14 connect the legs 12 at the top. A vertical pipe 15 (Fig. 2) extends from each of the lower horizontal pipes 13 to the corresponding top pipe 14 for the purpose of supporting a horizontal angle iron member 16 which carries the drum drive motor 17 and its gear box 18.

The major portion of the space within the case 11 is occupied by a drum 20 and its enclosing insulation 21. The rotatable drum 20 is preferably formed of two sheet steel discs 22 and 23 and a cylindrical piece of screening 24. The two discs 22 and 23 form the front and back sides of the drum 20, respectively. The screening 24 forms the outside, being welded about the periphery of each disc 22 and 23. The screen 24 is made slightly longer than the circumference of the discs 22 and 23 and one end of the screen 24 is carried inside the other in an overlapping relationship as indicated at 25. A piece of angle iron 26 and 27, formed to the shape of the drum 20, is welded to the inside of each disc 22 and 23 and to the sides of the screen 24 to hold the screen 24 rigidly to the discs 22 and 23. Four tie rods 28 extend from the front disc 22 to the rear disc 23 and impart additional rigidity to the drum 20.

The drum is supported by a larger diameter rod 30 to which the end discs 22 and 23 are welded. This rod is journaled in suitable bearings 31 and 32 and is provided with a driving sprocket 33.

A second piece of screen 34 having a larger mesh than the outer screen 24 spirals outwardly from the center axis of the drum 20, being secured at the inner end to the rod 30. This screen 34 is formed to a slight auger shape, the rear edge (indicated at 35 in Fig. 3) being wound in a tighter spiral. Thus any given portion of the screen 34 slopes downwardly toward the front of the machine 10. The outer end of this screen 34 indicated at 39a in the preferred embodiment does not meet with the outer screen 24, a gap of approximately two inches being left.

The outer screen 24 is preferably of such a mesh size that unpopped corn will not pass through it, while the inner screen 34 is of such mesh that unpopped or improperly popped corn will pass through but well popped corn will be retained thereon. It is preferred that the openings through the outer screen 24 be $\frac{3}{16}''$ square while the inner screen have $\frac{1}{2}''$ square openings.

The drum 20 is placed inside a cylindrical space 37 having a diameter slightly larger than that of the drum 20. This space 37 is formed by bending a plate 38 (Fig. 3) of sheet metal to an approximate cylinder. A blanket of insulating material 21 is fastened to the outside of the plate 38, and a second sheet metal plate 49 covers the insulation 21.

A portion of the plate 38 is perforated as indicated at 41 to provide a means for introducing heated air into the drum space 37. This perforated portion 40 extends the entire length of the drum and connects the interior of the space 37 with a duct 42.

A circular opening 43 (Figs. 1 and 2) is provided in the front disc 22 of the drum 20 to provide access for the charging of corn into the drum and the outflow of popped corn. A corresponding opening 44 (Fig. 1) is provided in the front of the machine. A chute 45 is provided on the outside of the case 11 to convey popped corn into a container (not shown) spaced below. A hood 46 is provided above the opening 44 for conducting any hot gases which escape through the opening 44 back into the machine 10.

The drum 20 is preferably rotated by a motor 17 driving a sprocket 47 through a gear box 18. A chain 48 connects this sprocket 47 with the sprocket 33 on the drum shaft 30. The motor 17 is a reversible constant speed motor so that the drum may be driven in either direction. It is preferable that a gear box and pulley combination be selected which will permit the drum 20 to be driven at a speed of about 30 R. P. M.

Heat required to pop the corn charged into the drum 20 is generated in the burner unit 50 which comprises a cylindrical chamber 51, an air blower 52, a gas burner jet 53, and associated equipment. The cylindrical combustion chamber 51 is preferably supported in a horizontal position below and to the rear of the drum. The interior of this chamber 51 is lined with firebrick (not shown) so as to resist the effects of the heat formed. The gas burner inlet jet 53 opens into one end of the chamber 51 and the blower 52 is disposed at the other end so as to suck air through the chamber 51 when operated by its drive motor 54. The impeller of the blower 52 is mounted on a shaft 55 driven by a V belt 56 which connects a pulley 57 on the shaft 55 to the drive pulley 58 on the motor 54.

The gas jet 53 is of the conventional type, being provided with a means for aspirating air into the combustion chamber 51 as gas flows in. A pilot burner 60 is also provided in the chamber 51 and is preferably disposed below the jet 53 so that its flame will light the main jet flame.

The pilot burner is preferably ignited by an electric spark formed between a spark gap 61 (Fig. 5) located within the pilot burner. High voltage electricity is supplied to the gap 61 by a transformer 62 each time the starting button (not shown) on the relay cabinet 63 is actuated. A solenoid 64 opens a valve 65 (Fig. 3) in the gas conduit 66 to supply gas to the pilot burner 60 each time the starting button is actuated.

A temperature actuated switch 66a (indicated as a bimetal switch in Fig. 5) operates a solenoid 67 to open a valve 68 (Fig. 3) in the gas line conduit 69 leading to the main burner jet 53 at all times when either the pilot burner 60 or main burner jet 53 is ignited. Thus the temperature actuated switch is disposed so as to be actuated by either the flame of the main jet 53 or the pilot 60. Should the main jet flame and pilot flame be extinguished as when the gas supply fails and then is restored, the temperature actuated switch 66a will open, causing the solenoid 67 to close the valve 68 and shut off the gas supply until such time as the pilot flame is relighted. A stop switch (not shown) is also provided in the relay cabinet 63 for closing the solenoid valve 68 to shut off both the burner 53 and pilot burner 60.

The temperature of the air leaving the combustion chamber is regulated by a conventional throttling temperature control 70 whose temperature bulb 71 (Figs. 2 and 3) is located downstream of the blower 52. This device 70 serves to cut down or increase the gas supply according to whether the bulb 71 is warmer or cooler than the desired temperature. A temperature setting of between 500° F. and 650° F. has proved desirable for the purpose of popping corn.

The combustion chamber 51 is connected directly to the duct 42 which opens into the drum space 37, the blower 52 forcing the hot air blast from the chamber into the duct 42. Air leaving the drum space 37 at the top passes into a horizontal duct 72 from which it flows downwardly through a duct 73 which opens into the combustion chamber 51. Thus a close circuit of air flow through the chamber 51, into the drum space 37 over the drum 20, and back to the chamber 51 is maintained.

The operation of the machine 10 is as follows: The blower motor 54 is turned on by means of the switch 77. The start button (not shown) on the relay cabinet 63 is then actuated to light the pilot light and ignite the main burner jet 53, as has previously been described. After the heat has been on for a few minutes and the machine is up to temperature, the reversing switch 76 (Fig. 5) is closed to cause the motor 17 to rotate the drum 20 in the clockwise direction as viewed in Fig. 3. When the drum 20 is in motion, a charge of corn kernels 75 (Fig. 3) is placed inside the drum 20 through the openings 43 and 44 in the front of the machine 10. A total charge of about twenty pounds has been found to be the most economical in commercial size machines. This charge of corn 75, being unpopped, passes through the inner screen 34 and is retained on the outer screen 24.

As the blast of heated air passes through the openings in the screen 24 and over the unpopped corn 75 retained thereon, heat is transferred to the kernels, causing some of them to pop. As the drum 20 rotates, the kernels of corn are in constant motion so that all sides of single kernels are subjected to the blast of hot air without charring or burning.

As the drum 20 rotates, the charge remains at the bottom of the drum 20 though tending slightly to climb up the rising side of the drum. Thus all the charge is disposed over the perforated plate 41. Unpopped corn being heavier tends to tumble toward the bottom of the drum 20 while the lighter popped corn tends to climb higher up the side.

The popped corn, as positioned over the perforated plate 41, is caught in the blast of hot air flowing through the plate 41 and lifted away from the unpopped portion of the charge. The velocity of this blast is preferably such that it will lift a completely, or nearly completely, popped kernel but will not lift one which is only partially popped.

Each time the outer end 34a of the screen 34 passes the plate 41 it passes in between those popped kernels which are lifted away from the outer screen 24 and the unpopped portions of the charge. Thus the inner screen 34 picks up only completely popped kernels as it passes through the air blast. Popped kernels which are not picked up by the inner screen during one revolution are picked up during the next or subsequent revolutions. The few unpopped kernels which are lifted by the air blast pass through the openings in the inner screen 34 while the popped kernels 78 are retained thereon. As the drum 20 continues to rotate, the popped kernels 78 progress upwardly and forwardly due to the auger-like action of the inner screen, eventually passing out of the openings 44 and 45 in the front of the machine. Thus the popped corn 78 is separated from the unpopped corn 75 and removed from the drum 20.

When the charge is completely popped, as audibly indicated to the operator when the sound of the corn popping may no longer be heard or the rate of popping has decreased to a very low value, the reversing switch 76 is thrown in the opposite direction to reverse rotation of the drum 20 which then travels in the counterclockwise direction as shown in Fig. 3. When this has been done, the scrap, in the form of the unpopped and partially popped kernels and bits of popped corn which are retained on the outer screen 24, drops off the outer end of the screen 24 (at the point indicated at 25 in Fig. 3) falling into the scrap drawer 80, as shown in Fig. 4. Because of the contour of the screen 24, when the drum is rotated in the clockwise direction, scrap or charge will not be dumped into the drawer, for the inner end of the screen 24 overlaps the outer end and the charge merely falls from the inner end onto the outer end.

After the dumping of the scrap, the drum 20 may be again reversed and the machine 10 is ready for a second charge.

The machine 10 of this invention has been found to have many advantages over conventional machines, among them being the following:

(1) The amount of scrap produced is substantially reduced to one-half the usual amount.

(2) A larger initial charge may be placed in a given sized machine.

(3) Recirculation of air through the burner unit results in savings in fuel and reduction in heat losses and also serves to consume any smoke, dust, and chaff formed in the popping process resulting in cleaner and cooler operation.

(4) The hazard due to fire has been practically eliminated. Experiments conducted by popping a charge and stopping the rotation of the drum resulted in the corn's being completely dehydrated but no flames were produced.

In event the air blast is not relied upon to lift the popped kernels, a portion of the drum 20a of a modified embodiment of the apparatus of this invention is shown in Fig. 6. The modified drum 20a is identical with the drum 20 except that a strip 81 of screen is pivotally attached to the outer end 39a of the screen 34a. The strip 81 swings freely on the end 39a, being in the position shown in the drawing (Fig. 6) when the drum 20a is rotated in the clockwise direction and the strip 81 is over the perforated plate 41.

During popping, the strip 81, since it lies against the outer screen 24a, serves to positively pick up any kernels of popped corn. During the scrap removal portion of the cycle, when the drum 20a is rotated in the opposite direction, the strip 81 will lie in a position alongside the inner screen 34a, being folded back in the opposite direction. Thus bits of scrap are not caught in the pocket which would be formed between the inner screen 34a and the outer screen 24a were the inner screen 34a joined directly to the outer screen 24a.

It is to be understood that the invention is not limited to the embodiment described above, but various changes and modifications such as will suggest themselves to those familiar with the art may be made without departing from the spirit of the invention, whose scope is defined by the following claims.

What is claimed is:

1. An apparatus for popping corn comprising a rotating perforated drum for receiving a charge of corn, a blower for inducing a radially extending stream of air through said drum, and a burner for heating said stream of air prior to its entry into said drum, said drum having an inner screen of a mesh small enough to retain popped corn thereon, said screen spiralling inwardly from a line spaced inwardly from the periphery of said drum.

2. An apparatus for popping kernels of corn comprising a perforated enclosure for receiving a charge of corn, blower means for inducing a radially extending heated stream of air of sufficient velocity to lift popped kernels through said enclosure, and a second perforated enclosure having an edge spaced from the first mentioned enclosure and having openings therein, said openings being of such size as to pass unpopped kernels of corn and retain popped kernels, said second enclosure being disposed in the path of said warm air stream to retain popped kernels thereon, permitting any unpopped kernels entrained in said stream to fall back to the point at which air is introduced into said first mentioned enclosure.

3. An apparatus for popping corn comprising a perforated enclosure for receiving and retaining a charge of unpopped corn, perforated means for conveying popped corn from said enclosure to the outside thereof comprising a moving perforated element within said enclosure, said element having an edge spaced from the wall of said enclosure and the perforations in said element being of such size as to pass unpopped kernels and retain popped kernels, and blower means for circulating heated air through said enclosure from the bottom to the top to lift popped kernels above said edge, said moving element being so disposed as to discharge any unpopped kernels picked up by the hot air stream into the bottom of said enclosure.

4. In a device of the class described, a rotatable perforated enclosure for retaining a charge of popcorn, a second rotatable enclosure inside said first mentioned enclosure having perforations therein of such size as to retain popped corn and pass unpopped corn, said second enclosure having an edge spaced from the wall of the first mentioned enclosure, means for creating a blast of hot air through said enclosures to cause said corn to pop and to lift the popped kernels over the edge of the second enclosure.

5. A device for popping kernels of corn comprising a cylindrical body of perforated material for receiving and retaining a charge of unpopped corn, means for rotating the body about a fixed axis, a body of perforated material of spiral configuration secured within said cylindrical body with one edge of the spiral body spaced from an inner wall of the cylindrical body, and means for impelling a stream of hot air radially inward toward said axis through both of said perforated bodies to transfer popped kernels of corn from the cylindrical body to the spiral body.

6. A device for popping kernels of corn comprising a convolute body of perforate material having one end thereof overlapping and spaced radially inward from another end thereof, a perforate body of spiral configuration secured within the convolute body with one edge of the spirally formed body spaced from the convolute body, the perforations in said spirally formed body being smaller than the size of popped kernels and larger than unpopped or partially popped kernels, means for producing a stream of hot gaseous medium radially inward toward the center of said convolute body, and means for moving the perforate bodies relative to the stream whereby the stream lifts popped kernels of corn from said convolute body to the spirally formed body.

7. A device for popping kernels of corn comprising a convolute body of perforate material for receiving and retaining a charge of unpopped kernels, one end of said body being spaced radially inward from the other end of said body, a perforate body of spiral configuration secured within said convolute body and having one end of said spirally formed body spaced radially inward from the innermost end of said convolute body, means for producing a stream of heated gaseous medium radially inward through said perforate bodies, and means for rotating said bodies relative to the stream in the direction of formation of the body of spiral configuration whereby the edge of the spirally formed body receives and conveys the popped kernels of corn lifted by the stream as said edge passes through said stream.

DELORE J. MORSETTE.

REFERENCES CITED

The following references are of record in the file of this patent:

UNITED STATES PATENTS

| Number | Name | Date |
| --- | --- | --- |
| Re. 11,290 | Olson | Nov. 29, 1892 |
| 518,664 | Donathen | Apr. 24, 1894 |
| 760,604 | Bartholomew | May 24, 1904 |
| 864,685 | Post | Aug. 27, 1907 |
| 904,186 | Eckstein | Nov. 17, 1908 |
| 1,104,990 | Harding | July 28, 1914 |
| 1,648,005 | Pritchard | Nov. 8, 1927 |
| 1,730,550 | Yamada | Oct. 8, 1929 |
| 1,868,578 | Knott | July 26, 1932 |
| 2,496,199 | Bushway | Jan. 31, 1950 |

FOREIGN PATENTS

| Number | Country | Date |
| --- | --- | --- |
| 409,596 | Great Britain | May 3, 1934 |